US011392149B2

(12) United States Patent
Cummings et al.

(10) Patent No.: US 11,392,149 B2
(45) Date of Patent: Jul. 19, 2022

(54) WATER MANAGEMENT SYSTEM AND METHOD

(71) Applicants: Caroma Industries Limited, North Sydney (AU); micas AG, Oelsnitz (DE)

(72) Inventors: Steve Cummings, East Mona Vale (AU); Michael Fritzsche, Neukirchen/Erzgebirge (DE); Mark Ebert, Oelsnitz/Erzgebirge (DE)

(73) Assignees: Caroma Industries Limited, Queensland (AU); micas AG, Oelsnitz (DE)

( * ) Notice: Subject to any disclaimer, the term of this patent is extended or adjusted under 35 U.S.C. 154(b) by 3 days.

(21) Appl. No.: 17/121,579

(22) Filed: Dec. 14, 2020

(65) Prior Publication Data

US 2021/0116946 A1   Apr. 22, 2021

Related U.S. Application Data

(63) Continuation of application No. 16/583,095, filed on Sep. 25, 2019, now Pat. No. 10,901,439, which is a (Continued)

(30) Foreign Application Priority Data

Sep. 18, 2014 (AU) ............................... 2014903727

(51) Int. Cl.
*G05D 7/06* (2006.01)
*G05B 15/02* (2006.01)
(Continued)

(52) U.S. Cl.
CPC .......... *G05D 7/0676* (2013.01); *G05B 15/02* (2013.01); *G05D 7/0617* (2013.01);
(Continued)

(58) Field of Classification Search
CPC .. G05D 7/0676; G05D 7/0617; G05D 7/0635; G05B 15/02; E03B 7/04; H04L 67/10
See application file for complete search history.

(56) References Cited

U.S. PATENT DOCUMENTS 5,568,825 A    10/1996  Faulk
5,801,940 A *   9/1998  Russ ................. G05D 23/1934
                                                             700/9
(Continued)

FOREIGN PATENT DOCUMENTS

CN    102135312 A     7/2011
CN    102739479 A    10/2012
(Continued)

*Primary Examiner* — Ronald D Hartman, Jr.
(74) *Attorney, Agent, or Firm* — Seed Intellectual Property Law Group LLP

(57) ABSTRACT

A water management method for controlling at least one operational parameter of at least one water control device, wherein the operational parameter is associated with water used by the water control device, the method comprising: sending, from an electronic controller of the water control device, operational data associated with the operational parameter to an embedded electronic device; receiving, at the embedded electronic device, the operational data, and developing control data based on the received operational data and sending the control data to the electronic controller; and receiving, at the electronic controller, the control data and controlling the operational parameter of the water control device based on the received control data.

20 Claims, 11 Drawing Sheets

Related U.S. Application Data continuation of application No. 15/511,338, filed as application No. PCT/AU2015/000571 on Sep. 17, 2015, now Pat. No. 10,481,619.

(51) Int. Cl.
 *H04L 67/10* (2022.01)
 *E03B 7/04* (2006.01)

(52) U.S. Cl.
 CPC ........... *G05D 7/0635* (2013.01); *H04L 67/10* (2013.01); *E03B 7/04* (2013.01)

(56) References Cited

U.S. PATENT DOCUMENTS

| | | | |
|---|---|---|---|
| 8,606,413 B2 | 12/2013 | Picton | |
| 2003/0001721 A1* | 1/2003 | Daum | H04L 67/125 340/531 |
| 2003/0093161 A1 | 5/2003 | Gauthier et al. | |
| 2003/0126295 A1 | 7/2003 | Doherty | |
| 2003/0149757 A1* | 8/2003 | Ueno | H04L 61/2092 709/223 |
| 2004/0203387 A1 | 10/2004 | Grannan | |
| 2007/0038563 A1 | 2/2007 | Ryzerski | |
| 2007/0156864 A1* | 7/2007 | McCoy | H04L 12/282 709/222 |
| 2008/0167931 A1* | 7/2008 | Gerstemeier | H02J 3/008 705/7.22 |
| 2009/0046715 A1* | 2/2009 | Mccoy | H04N 7/181 370/389 |
| 2010/0155635 A1 | 6/2010 | Fima | |
| 2010/0169290 A1* | 7/2010 | McCoy | H04L 12/4625 709/219 |
| 2010/0188261 A1* | 7/2010 | Fujii | G01F 1/66 431/13 |
| 2011/0012738 A1* | 1/2011 | Nakamura | G06Q 10/06 137/551 |
| 2011/0114202 A1 | 5/2011 | Goseco | |
| 2011/0153101 A1* | 6/2011 | Thomas | G06Q 50/06 700/291 |
| 2011/0284519 A1 | 11/2011 | Hsu | |
| 2012/0078722 A1 | 3/2012 | Van Oosterwijck | |
| 2012/0095602 A1 | 4/2012 | Haller et al. | |
| 2012/0296451 A1 | 11/2012 | Kaps et al. | |
| 2012/0323368 A1 | 12/2012 | White, III et al. | |
| 2013/0006400 A1* | 1/2013 | Caceres | H04L 12/2803 700/90 |
| 2014/0025795 A1* | 1/2014 | Fiennnes | H04L 41/0806 709/222 |
| 2014/0067131 A1* | 3/2014 | Park | D06F 34/05 700/275 |
| 2014/0087661 A1* | 3/2014 | Kim | H04B 5/0025 455/41.1 |
| 2014/0297048 A1* | 10/2014 | Buchheit | H04L 12/2803 700/282 |
| 2015/0032505 A1* | 1/2015 | Kusukame | G06Q 30/0269 705/7.31 |
| 2015/0046580 A1* | 2/2015 | Sasagawa | H04L 41/0816 709/224 |
| 2015/0074259 A1* | 3/2015 | Ansari | G06F 16/1847 709/224 |
| 2015/0088570 A1 | 3/2015 | Yenni et al. | |
| 2015/0294558 A1* | 10/2015 | Huang | G08C 17/02 340/5.61 |
| 2016/0077530 A1 | 3/2016 | Moran et al. | |

FOREIGN PATENT DOCUMENTS

| | | |
|---|---|---|
| CN | 102792639 A | 11/2012 |
| WO | 2009/061857 A2 | 5/2009 |

* cited by examiner

WATER MANAGEMENT SYSTEM AND METHOD

BACKGROUND

Technical Field

The present disclosure relates generally to a water management system and method for controlling one or more water control devices. The present disclosure also relates to a computing device for controlling one or more water control devices.

Description of the Related Art

In general, water control devices are devices that are used with water and that can control at least one operational parameter associated with the water such as, for example, temperature, flow rate, pressure, etc. Water control devices may be connected to a water source to enable those devices to function as designed. These water control devices may be, for example, "end of line" plumbing fixtures such as tap ware, urinals, cisterns, showers, toilets and "inline" plumbing fixtures such as, for example, flow control valves, thermostatic mixing valves (TMV) and water re-circulation pumps.

For example, water control devices may be used in one or more environments or areas such as kitchens, bathrooms, restrooms, toilets and the like. For example, these water control devices may be bathroom or kitchen products and the like including urinals, basins, shower heads, taps and toilets, for example. As a further example, water control devices may be plumbing fixtures and the like. As yet a further example, water control devices may be other types of devices in which water is used such as water reticulation systems, water storage units, water sprinklers, hoses and outdoor taps, for example When a problem occurs with a particular water control device, it can be problematic to diagnose where the problem has occurred and which particular water control device is causing the problem.

For example, if a blockage occurs within one of five urinals in a bathroom facility, it is not easy to diagnose which (if any) of the urinals is causing the blockage. One or more of the urinals may need to be removed to assess whether they are the cause of the blockage. During this assessment, the bathroom facility must be closed for use.

Further, even if an engineer is able to determine that a particular water control device is not working within a set of desired operational parameters, it is usually necessary to at least partially dismantle the water control device in order to adjust the various operational parameters of the water control device so that they are set to the desired level.

Water control devices may be installed in bathroom facilities in various areas where excessive water usage is of concern and so its supply may be limited. To assist with this, low water usage type devices may be used. However, in situations where there is a desire to limit water usage further due to environmental conditions such as drought or a long period of hot weather, or due to water restrictions being put in place by local authorities, it may become necessary to manually reduce the water usage in each separate water control device.

In medium to large buildings, multiple bathroom facilities usually exist. Monitoring and control of the water used by the numerous water control devices in each of the bathroom facilities may be problematic and time consuming as it becomes necessary for individuals to move from facility to facility and device to device to assess any problems and monitor the water control devices. This problem is further exacerbated when a building manager is in charge of multiple buildings.

BRIEF SUMMARY

It is an object of the present disclosure to substantially overcome, or at least ameliorate, one or more disadvantages of existing arrangements, or to at least provide the public with a useful choice.

Disclosed are arrangements which seek to address the above problems by controlling one or more operational parameters of one or more water control devices in a central manner, and also by changing a mode of operation of one or more water control devices in a central manner.

According to a first aspect of the present disclosure, there is provided a water management method for controlling at least one operational parameter of at least one water control device, wherein the operational parameter is associated with water used by the water control device, the method comprising: sending, from an electronic controller of the water control device, operational data associated with the operational parameter to an embedded electronic device; receiving, at the embedded electronic device, the operational data, and developing control data based on the received operational data and sending the control data to the electronic controller; and receiving, at the electronic controller, the control data and controlling the operational parameter of the water control device based on the received control data.

According to a second aspect of the present disclosure, there is provided a water management method for controlling at least one operational parameter associated with at least one water control device located in at least one area, wherein the operational parameter is associated with water used by the water control device, the method comprising: sending, from at least one electronic controller associated with the water control device, operational data associated with the operational parameter to at least one central gateway device; receiving, at the central gateway device, the operational data, and sending the operational data to a web server; retrieving the operational data from the web server using a computing device; developing, at the computing device, control data based on the retrieved operational data and sending the control data to the electronic controller via the web server and the central gateway device; and receiving, at the electronic controller, the control data and controlling the operational parameter of the water control device based on the received control data.

According to a third aspect of the present disclosure, there is provided a water management method for controlling at least one operational parameter of at least one water control device, wherein the operational parameter is associated with water used by the water control device, the method comprising: determining, using a computing device, a mode of operation for the water control device based on water supply, developing control data based on the determined mode of operation and the operational parameter, and sending the control data to the electronic controller of the water control device; and the electronic controller receiving the control data and controlling the operational parameter based on the received control data.

According to fourth aspect of the present disclosure, there is provided a water management method for controlling at least one operational parameter of at least one water control device, wherein the operational parameter is associated with water used by the water control device, the method comprising: receiving, from an electronic controller of the water control device, operational data associated with the operational parameter; and developing control data based on the received operational data and sending the control data to the electronic controller for controlling the operational parameter of the water control device based on the received control data.

According to a fifth aspect of the present disclosure, there is provided a water management system for controlling at least one operational parameter of at least one water control device, wherein the operational parameter is associated with water used by the water control device, the system comprising an electronic controller of the water control device, and an embedded electronic device, wherein: the electronic controller is arranged to send operational data associated with the operational parameter to the embedded electronic device; the embedded electronic device is arranged to receive the operational data, develop control data based on the received operational data and send the control data to the electronic controller; and the electronic controller is further arranged to receive the control data and control the operational parameter of the water control device based on the received control data.

According to a sixth aspect of the present disclosure, there is provided a water management system for controlling at least one operational parameter associated with at least one water control device located in at least one area, wherein the operational parameter is associated with water used by the water control device, the system comprising at least one electronic controller associated with the water control device, at least one central gateway device, a server and a computing device, wherein: the electronic controller is arranged to send operational data associated with the operational parameter to the central gateway device; the central gateway device is arranged to receive the operational data, and send the operational data to the web server; the computing device is arranged to retrieve the operational data from the web server, develop control data based on the retrieved operational data and send the control data to the electronic controller via the web server and the central gateway device; and the electronic controller is further arranged to receive the control data and control the operational parameters of the water control device based on the received control data.

According to a seventh aspect of the present disclosure, there is provided a water management system for controlling at least one operational parameter of at least one water control device, wherein the operational parameter is associated with water used by the water control device, the system comprising a computing device and at least one electronic controller associated with the water control device, wherein: the computing device is arranged to determine a mode of operation for the water control device based on water supply, develop control data based on the determined mode of operation and the operational parameter, and send the control data to the an electronic controller of the water control device; and the electronic controller is arranged to receive the control data and control the operational parameter based on the received control data.

According to an eighth aspect of the present disclosure, there is provided a computing device for controlling at least one operational parameter of at least one water control device, wherein the operational parameter is associated with water used by the water control device, wherein: the computing device is arranged to receive operational data associated with at least one operational parameter from an electronic controller associated with a water control device, develop control data based on the received operational data and send the control data to the electronic controller for controlling the operational parameter of the water control device based on the received control data.

Other aspects of the present disclosure are also disclosed.

BRIEF DESCRIPTION OF THE SEVERAL VIEWS OF THE DRAWINGS

At least one embodiment of the present disclosure will now be described with reference to the drawings and appendices, in which.

DETAILED DESCRIPTION

Figure 1A:
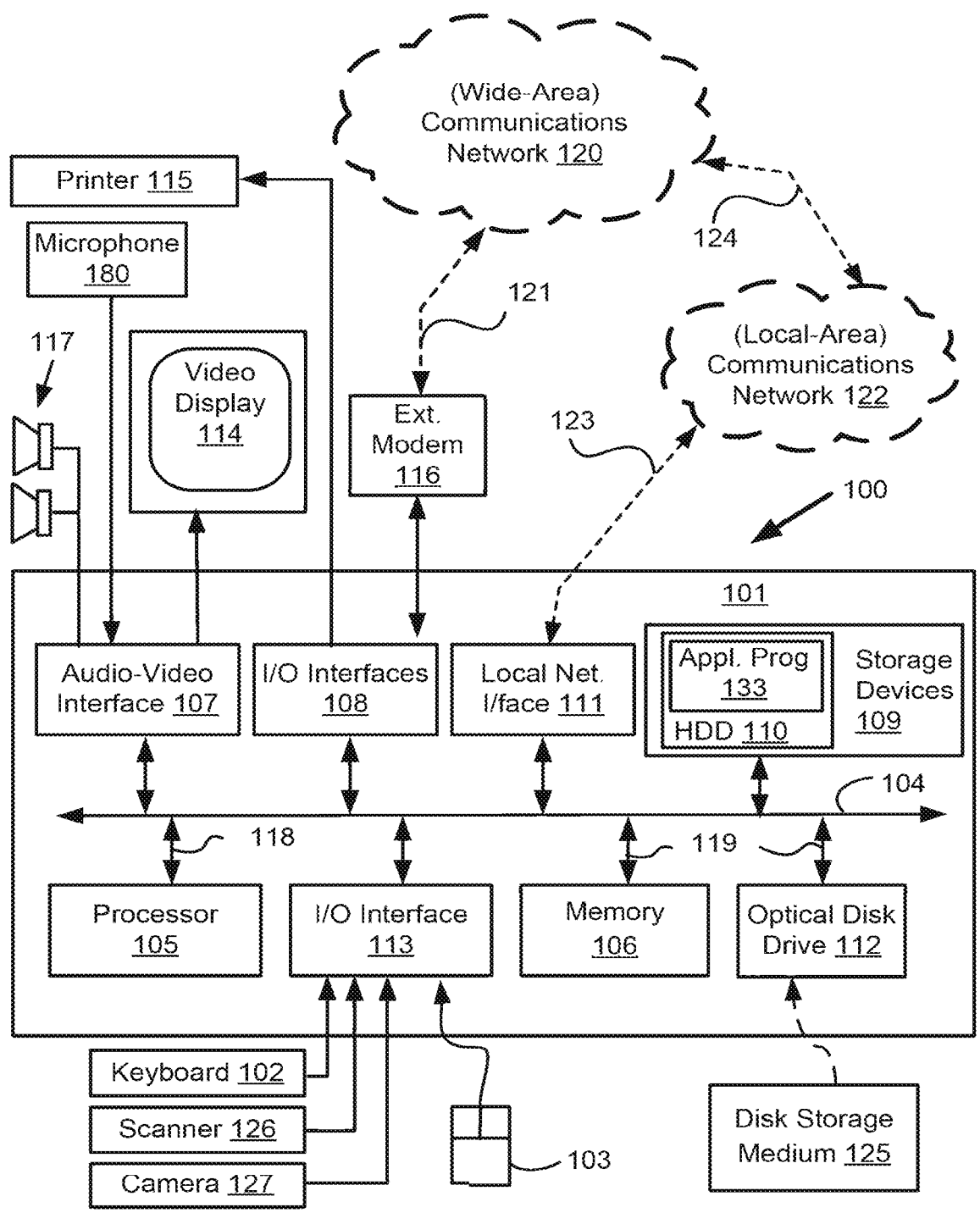
FIGS. 1A and 1B form a schematic block diagram of a general purpose computer system upon which arrangements described can be practiced.

Where reference is made in any one or more of the accompanying drawings to features, which have the same reference numerals, those features have for the purposes of this description the same function(s) or operation(s), unless the contrary intention appears.

Figure 1B:
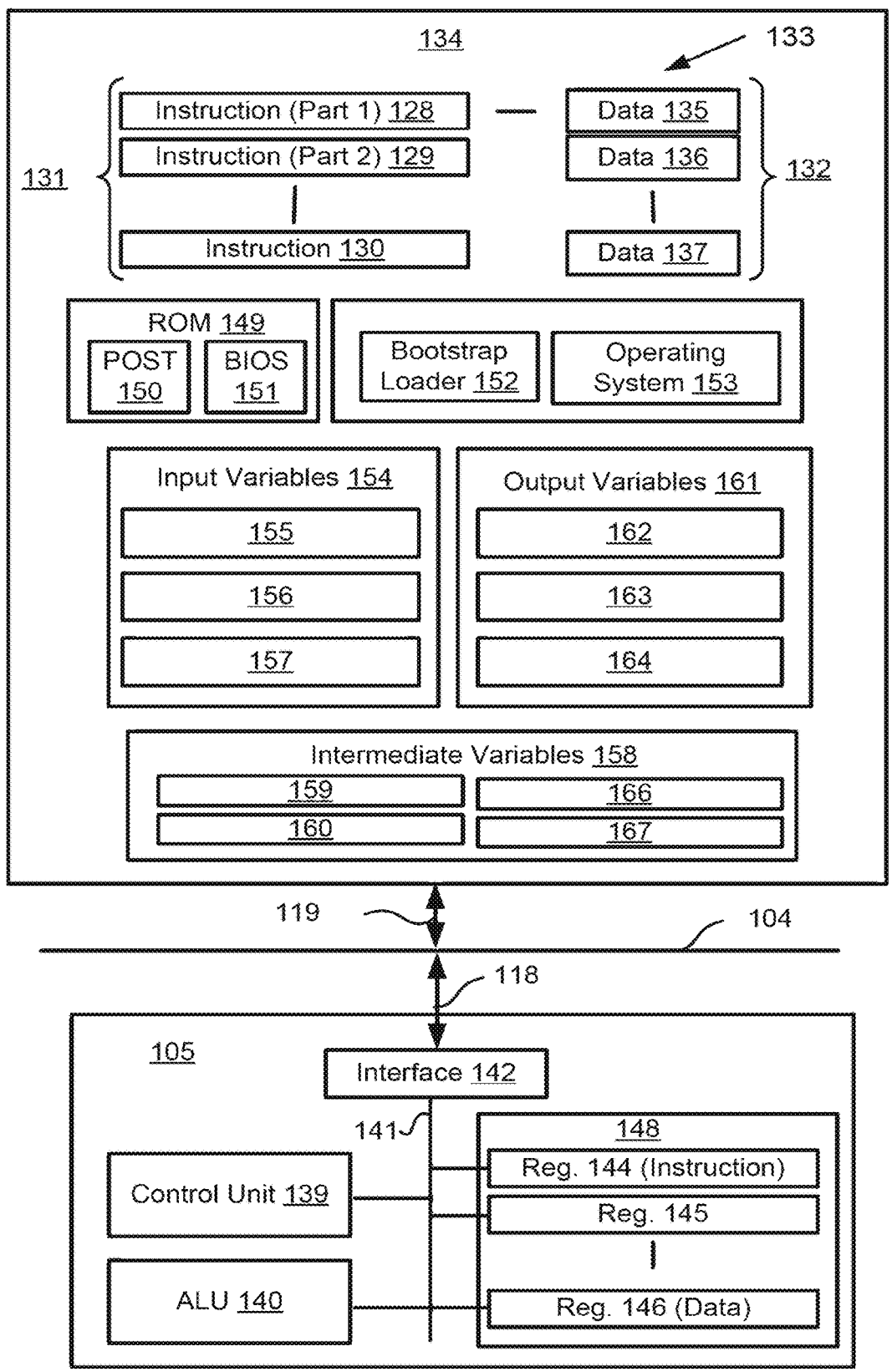

FIGS. 1A and 1B depict a general-purpose computer system 100, upon which various arrangements described herein may be practiced.

As seen in FIG. 1A, the typical computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick, touchscreen, voice recognition system or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practiced include IBM-PC's and compatibles, Sun Sparcstations, Apple Mac™ or a like computer systems.

In particular, the herein described computer may be configured as a web server to serve web pages to the Internet and to receive data in the form of instructions and information from other computers connected to the Internet. For example, the web server may be connected to a local area network (LAN) or a wide area network (WAN). Access to the web server may be by direct connection via the Internet or via other networks, such as LANs and WANs. The web server may further include functionality to perform the various methods described below.

One or more of the methods as described herein may be implemented using the computer system 100 wherein the processes of FIGS. 6-9 to be described, may be implemented as one or more software application programs 133 executable within the computer system 100. For example, these processes may be effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the herein described methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus or system for managing water control devices.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for managing water control devices.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed water management arrangements use input variables 154, which are stored in the memory 134 in corresponding memory locations 155, 156, 157. The water management arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each sub-process in the processes of FIGS. 6 to 9 may be associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The methods of water management may alternatively be implemented in dedicated hardware such as one or more integrated circuits performing the functions or sub functions of water management. Such dedicated hardware may include graphic processors, digital signal processors, or one or more microprocessors and associated memories.

Figure 2A:
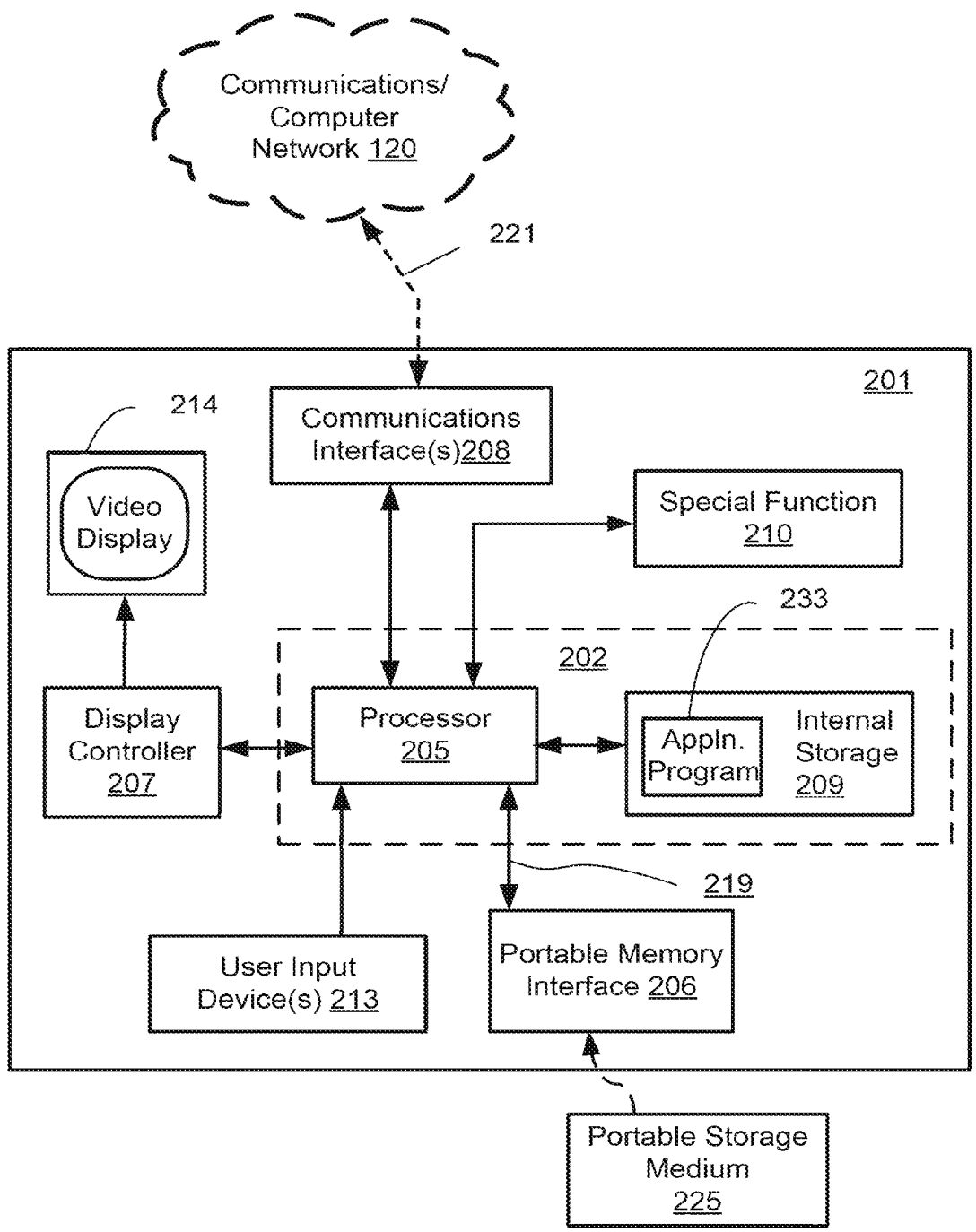
FIGS. 2A and 2B collectively form a schematic block diagram representation of an embedded electronic device upon which described arrangements can be practiced.
Figure 2B:
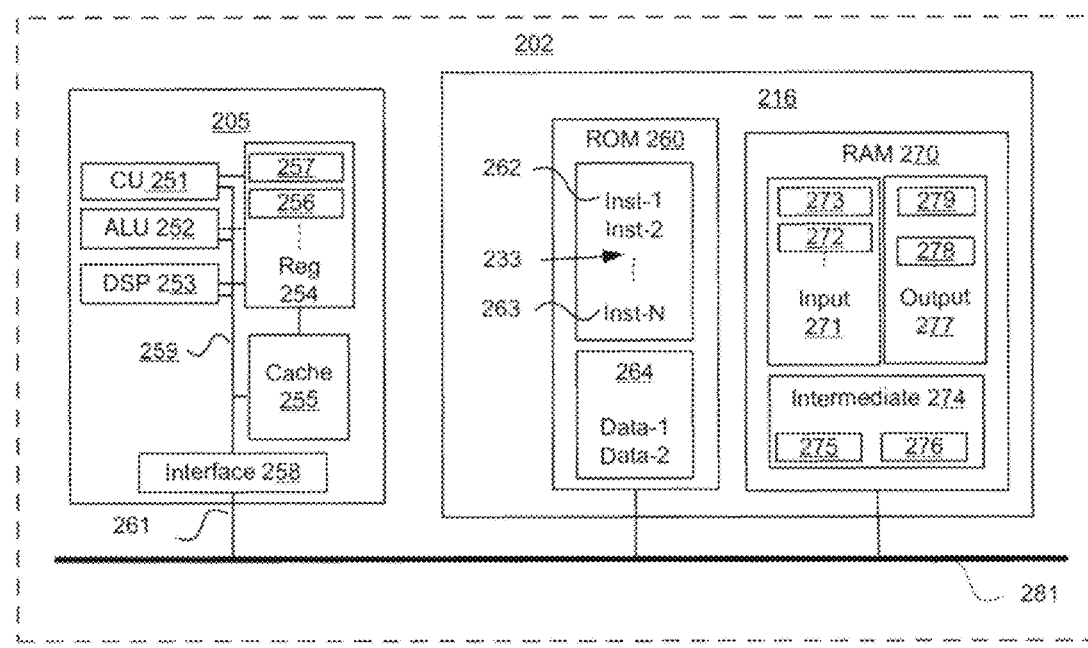

FIGS. 2A and 2B collectively form a schematic block diagram of a general purpose electronic device 201 including embedded components, upon which the water management methods to be described are desirably practiced. The embedded electronic device 201 may be, for example, a mobile phone, a tablet device, a smart watch, personal digital assistant type device or any other embedded electronic device, in which processing resources are limited. Nevertheless, the methods to be described may also be performed on higher-level devices such as desktop computers, server computers, and other such devices with significantly larger processing resources.

As seen in FIG. 2A, the electronic device 201 comprises an embedded controller 202. Accordingly, the electronic device 201 may be referred to as an "embedded device." In the present example, the controller 202 has a processing unit (or processor) 205 which is bi-directionally coupled to an internal storage module 209. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

The electronic device 201 includes a display controller 207, which is connected to a video display 214, such as a liquid crystal display (LCD) panel or the like. The display controller 207 is configured for displaying graphical images on the video display 214 in accordance with instructions received from the embedded controller 202, to which the display controller 207 is connected.

The electronic device 201 also includes user input devices 213 which are typically formed by keys, a keypad or like controls. In some implementations, the user input devices 213 may include a touch sensitive panel physically associated with the display 214 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 2A, the electronic device 201 also comprises a portable memory interface 206, which is coupled to the processor 205 via a connection 219. The portable memory interface 206 allows a complementary portable memory device 225 to be coupled to the electronic device 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 201 also has a communications interface 208 to permit coupling of the device 201 to a computer or communications network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 201 is configured to perform some special function. The embedded controller 202, possibly in conjunction with further special function components 210, is provided to perform that special function. For example, where the device 201 is a digital camera, the components 210 may represent a lens, focus control and image sensor of the camera. The special function components 210 are connected to the embedded controller 202. As another example, the device 201 may be a mobile telephone handset. In this instance, the components 210 may represent those components required for communications in a cellular telephone environment. Where the device 201 is a portable device, the special function components 210 may represent a number of encoders and decoders of a type including Joint Photographic Experts Group (JPEG), (Moving Picture Experts Group) MPEG, MPEG-1 Audio Layer 3 (MP3), and the like.

Various methods described hereinafter may be implemented using the embedded controller 202, where the processes of FIGS. 6 to 9 may be implemented as one or more software application programs 233 executable within the embedded controller 202. The electronic device 201 of FIG. 2A implements the described methods. In particular, with reference to FIG. 2B, the described methods are effected by instructions in the software 233 that are carried out within the controller 202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 233 of the embedded controller 202 is typically stored in the non-volatile ROM 260 of the internal storage module 209. The software 233 stored in the ROM 260 can be updated when required from a computer readable medium. The software 233 can be loaded into and executed by the processor 205. In some instances, the processor 205 may execute software instructions that are located in RAM 270. Software instructions may be loaded into the RAM 270 by the processor 205 initiating a copy of one or more code modules from ROM 260 into RAM 270. Alternatively, the software instructions of one or more code modules may be pre-installed in a non-volatile region of RAM 270 by a manufacturer. After one or more code modules have been located in RAM 270, the processor 205 may execute software instructions of the one or more code modules.

The application program 233 is typically pre-installed and stored in the ROM 260 by a manufacturer, prior to distribution of the electronic device 201. However, in some instances, the application programs 233 may be supplied to the user encoded on one or more CD-ROM (not shown) and read via the portable memory interface 206 of FIG. 2A prior to storage in the internal storage module 209 or in the portable memory 225. In another alternative, the software application program 233 may be read by the processor 205 from the network 220, or loaded into the controller 202 or the portable storage medium 225 from other computer readable media. Computer readable storage media refers to any non-transitory tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 201. Examples of transitory or non-tangible computer readable transmission media that may also participate in the provision of software, application programs, instructions and/or data to the device 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 233 and the corresponding code modules mentioned above may be executed to implement one or more graphical user interfaces (GUIs) to be rendered or otherwise represented upon the display 214 of FIG. 2A. Through manipulation of the user input device 213 (e.g., the keypad), a user of the device 201 and the application programs 233 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 202 having the processor 205 for executing the application programs 233 and the internal storage 209. The internal storage 209 comprises read only memory (ROM) 260 and random access memory (RAM) 270. The processor 205 is able to execute the application programs 233 stored in one or both of the connected memories 260 and 270. When the electronic device 201 is initially powered up, a system program resident in the ROM 260 is executed. The application program 233 permanently stored in the ROM 260 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252, a digital signal processor (DSP) 2153 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261.

The application program 233 includes a sequence of instructions 262 through 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. This set of instructions may be organized into blocks, which perform specific tasks or handle specific events that occur in the electronic device 201. Typically, the application program 233 waits for events and subsequently executes the block of code associated with that event. Events may be triggered in response to input from a user, via the user input devices 213 of FIG. 2A, as detected by the processor 205. Events may also be triggered in response to other sensors and interfaces in the electronic device 201.

The execution of a set of the instructions may require numeric variables to be read and modified. Such numeric variables are stored in the RAM 270. The disclosed method uses input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each sub-process in the processes of the methods described below is associated with one or more segments of the application program 233, and is performed by repeated execution of a fetch-execute cycle in the processor 205 or similar programmatic operation of other independent processor blocks in the electronic device 201.

Figure 3:
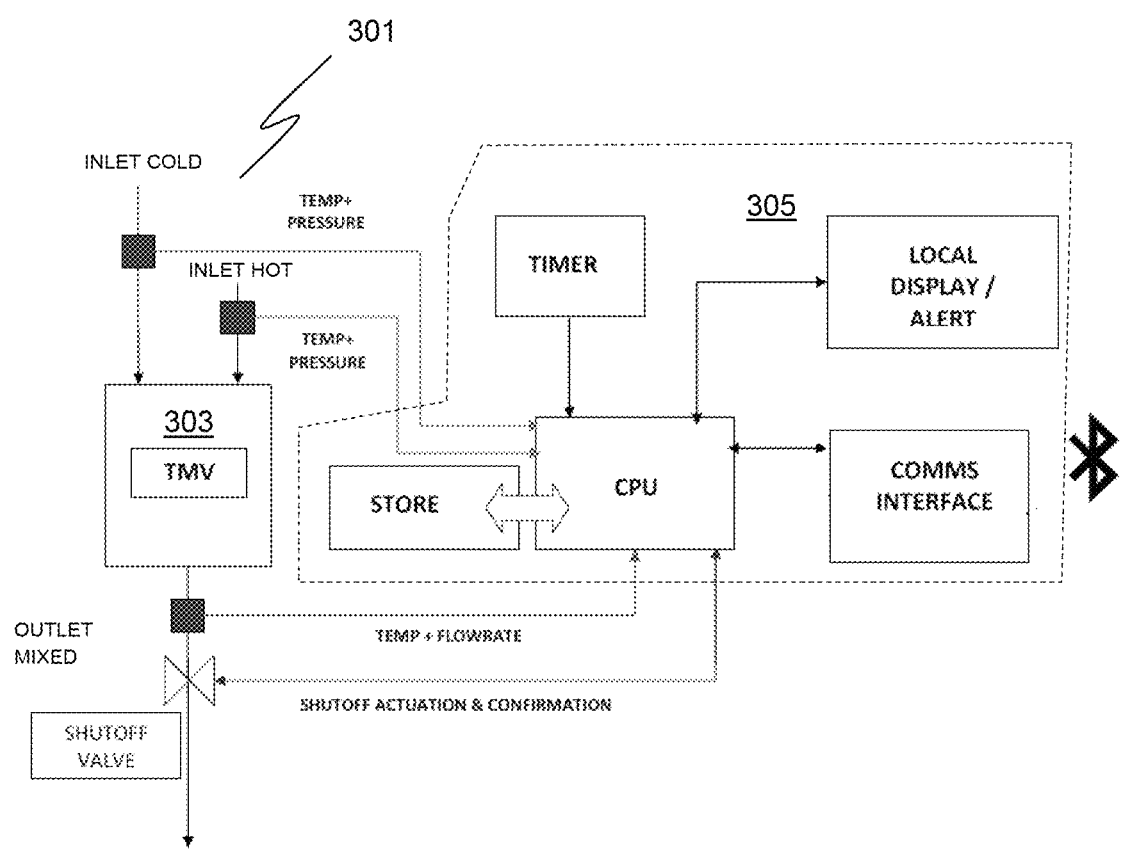
FIG. 3 shows a water control device with an electronic controller according to the herein disclosure.

FIG. 3 shows an example of a water control device with an electronic controller. In this example, the water control device 301 is a tap that includes a thermostatic mixing valve (TMV) 303. The TMV blends hot water with cold water to a predetermined constant temperature. Sensors are attached to the hot water and cold water inlet pipes to sense the input pressure and temperature of the hot and cold water as it enters the TMV. Further, a sensor is attached to the outlet pipe to sense temperature and flow rate. The cold water input pressure, hot water input pressure, cold water temperature, hot water temperature, output water temperature and output water flow rate are sent to a central processing unit (CPU) in an electronic controller 305. The CPU samples the inputs fed from the sensors and determines the temperature, pressures and flow rate associated with the water used by the water control device.

This information may be provided to a display, either locally or remotely by a communications adaptor. Operational parameters associated with the correct functioning of the water control device are stored in a data store. The CPU may compare the incoming data to the stored parameters to determine whether the water control device is functioning correctly as well as enabling the CPU to monitor the usage of water by the water control device. By comparing the incoming data with the stored data, the CPU determines whether the valve is functioning correctly. The CPU may control the shutoff value to disable water flow from the water control device to safely shutdown operation of the water control device should a problem be detected. Further, the CPU may also alert and report the status of the water control device to a user via a display either locally or remotely. The information sent to the CPU may be stored in a local store acting as a memory.

The electronic controller 305 also includes a communications adapter to enable the display and transfer of the data currently stored in the local store as well as data received from the water control device to a user via a wired connection. For example, the communications adapter may use a standard serial or parallel connection to a PC or a network. Alternatively, wireless data connections via Bluetooth™, for example, or RF technology may be utilized to transfer data to other devices or networks. Further, as described herein the communications adapter may transmit this data to an embedded electronic device, such as a mobile telephone which is in the vicinity of the electronic controller. It will be understood that other wireless data formats, transmission methods or standards may be used besides Bluetooth™.

The communications adapter may also allow the electronic controller of the water control device to communicate with and be monitored by a building management system (BMS) using standard BMS protocols such as BACnet, LON, etc. The communications adapter may allow multiple TMV monitoring system CPU's to be connected to a centralized monitoring display and data store using a network other than the BMS. For example, the communications adapter may use a computing local area network.

The data store may be connected to the CPU to save the incoming data received from the sensor for analysis and reporting purposes. The information stored in the data store of the electronic controller may be accessed by a user via a local display or a remote display to obtain status, performance statistics, maintenance information and regulatory reporting requirements. Further, the data received may also be transmitted to remote displays for analysis and reporting purposes. Further, a data store may also be provided on the remote displays to enable information to be stored for reporting and analysis purposes.

The local display is used to interface with a user. This display may include audio and/or visual alerts, a display screen, a connected computer, a connected smartphone or other embedded electronic device, or a building management system display.

The electronic controller may also include a timer that provides time and/or date stamping functionality for the input data as well as providing a time source for the CPU. The CPU may use the timer data when carrying out sampling functions on the received data.

As an example, the CPU may operate upon receiving data from the water control device by controlling a shut off valve connected to the outlet of the water control device. As will be explained in more detail below, the CPU of the electronic controller may also operate based on control data received from one or more external devices, such as embedded electronic devices, computing systems and building management systems.

Figure 4:
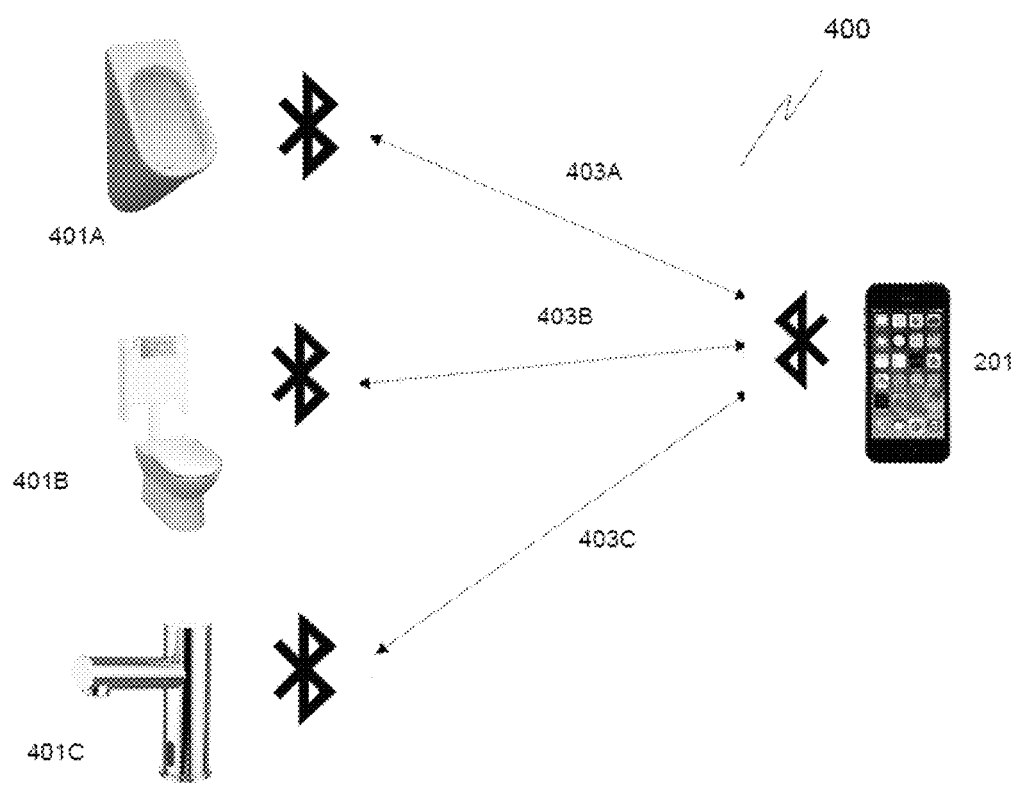
FIG. 4 shows a water management system according to the herein disclosure.

FIG. 4 shows a water management system. The water management system 400 includes a number of different water control devices (401A, 401B and 401C). A first water control device 401A is a urinal including an electronic controller (for example, similar or the same as that described above) attached therein. The second water control device 401B is a toilet with a further electronic controller (for example, similar or the same as that described above) attached therein. A third water control device is a tap unit with a thermostatic mixing valve with a built in electronic controller as described above. It will be understood that, as an alternative, the tap unit and thermostatic mixing valve may be separate and have separate electronic controllers.

Each of the electronic controllers in the water control devices is able to communicate via a Bluetooth connection (403A, 403B, 403C). An embedded electronic device, such as a mobile telephone, 201 also includes functionality to receive and transmit Bluetooth communications. That is, the mobile telephone and the electronic controllers of the water control devices pair with each other using known Bluetooth pairing processes. It will be understood that other wireless data formats, transmission methods or standards may be used besides Bluetooth™.

Software in the form of an App is provided within the mobile telephone and enables data to be retrieved from the water control devices and analyzed by the processor of the mobile telephone under operation of the software to produce an output in the form of control data. The control data is then sent back to the water control devices to control the operation of the water control device. According to this particular water management system, the mobile telephone 201 communicates on a one to one basis with each of the water control devices separately.

According to one example, the water management system enables a process for controlling at least one operational parameter associated with one or more of the water control devices. The operational parameter is associated with the water that is used by the water control device. According to this arrangement, the water management system includes the electronic controller of one or more of the water control devices as well as the mobile telephone device. The electronic controller in the water control device is arranged to send operational data associated with the operational parameters to the mobile telephone. The mobile telephone is then arranged to receive this operational data and, upon receipt, develop (i.e., create, modify, delete or otherwise produce) control data based on the received operational data. This control data is then sent back to the electronic controller via the Bluetooth connection. It will be understood that other wireless data formats, transmission methods or standards may be used besides Bluetooth™.

The electronic controller receives the control data from the mobile telephone and controls the operational parameter of the water control device based on that received control data.

The operational data sent from the electronic controller includes the data stored in the data store of the electronic controller as referred to above with respect to FIG. 3. The operational parameters include, for example, the temperature, water pressure and flow rate or other parameter associated with use of the water control device.

For example, the operational parameter associated with the water control device may control a reduction in the water use of the water control device. For example, the water control device may be operated to completely stop the use of any water. Alternatively, the water control device may be operated to reduce the amount of water volume used by the water control device over a predefined time period. Alternatively, the water control device may be controlled to reduce a time period in which water flow may be activated for the water control device. Therefore, the control data developed by the mobile telephone is developed to enable the water control device to reduce water use in this manner.

According to a further example, the mobile telephone may operate as a computing device that is arranged to determine a particular mode of operation for the water control devices based on water supply. The particular mode of operation may be determined by the mobile device through interaction with a user via a user interface on the mobile device. For example, the mobile device may display options for a user to select which mode of operation to use. For example, an option to operate the water control devices in a standard mode may be selected by a user on the user interface. Alternatively, an option for selecting a reduced water usage mode may be activated by the user via the user interface. As a further example, an option for a severe water restriction mode may be selected by a user on the user interface. Dependent on which mode has been selected, the mobile telephone may determine the mode and subsequently develop control data based on that determined mode of operation. The control data developed is also dependent upon the operational parameters of the water control device. The developed control data is then sent to the electronic controller of the water control device where the controller receives the control data and controls the operational parameters of the water control devices based on that received control data.

For example, in a standard mode of operation, the control data may provide the electronic controller with the necessary information to control the operational parameters of the water control device based on standard water usage. As another example, in the reduced water usage mode, the control data may provide instructions to the electronic controller to reduce operational parameter levels to reduce the amount of water used by the water control device by partially closing a water valve. As a further example, in the severe water restriction mode, the control data may include instructions for the electronic controller to reduce severely or stop water usage by the water control device by shutting off one or more valves fully or for a limited amount of time.

It will be understood that the control data may control the various water control devices in other ways depending on the selected mode of operation. It will also be understood that there may be other modes of operation that may be selected.

According to a further example, the control data may enable the electronic controller of the water control device to control operational parameters in order to stop water use by the water control device completely, reduce the amount of water volume used by the water control device in a defined period of time either by (a) a percentage of water volume compared to a water volume used in a standard mode or (b) a defined volumetric amount. Alternatively, the time that water flow is activated may be reduced by the electronic controller of the water control device. For example, the time water flow is activated may be reduced at a standard rate or an adjusted rate.

As a further example, the amount of water volume used by the water control device may be reduced by the electronic controller associated with the water control device. For example, the amount of water may be reduced by a percentage of water volume compared to a standard mode usage or by a defined volumetric amount.

As a further example, the amount of time that water flow is activated within the water control device may be reduced either at a standard rate or at an adjusted rate.

The electronic controller of the water control device may transfer operational data associated with the operational parameters used by the water control device to the mobile telephone. The mobile telephone (or computing device) may then develop the control data based on the determined mode of operation and the received operational data. Therefore, the control data is not only developed based on the mode of operation but also based on the amount of water usage being used by the water control device.

As a further alternative, the mode of operation may be determined by either the mobile device (or computing device) or building management system assessing the current environmental conditions or situation. Upon completing this assessment, a mode of operation may be set for the water control devices based on that assessment.

For example, the mode of operation could be selected based on real time & historical information gathered from a range of local environment sensors, such as rain gauges, temperature measurement, humidity measurement, etc. The retrieved data is then analyzed to determine if a water saving "performance profile" or mode of operation needs to be activated for one or more of the water control devices under control by the system.

For example, data may be retrieved via an external, centralized environmental information database, such as a database available from a bureau of meteorology. This data may be retrieved using any suitable technique, such as, for example, via an API.

Further, it will be understood that the system may be controlled to enter a defined mode of operation by an external authority, such as, for example, a government department, a local water authority, etc., during periods in which official water restriction regimes have been put in place, for example.

As a further example, the system may monitor predetermined usage limits, which have been set either by the user or an external authority, for example. Upon reaching the predetermined usage limit, the system may activate a defined mode of operation. It will be understood that the system may automatically activate the defined mode of operation or generate and output an alert for the operator indicating that the predetermined usage limits have been reached, thus allowing the operator to set the system to operate according to a desired mode of operation.

Further, the system may also use the information from one water control device and use it as feedback to control another water control device, thereby providing an error checking functionality. For example, data from a flow meter located in a tap may be compared against data from a flow meter sensor in the corresponding basin drain and be used to confirm that the water discharged from the tap has been successfully drained away from the basin. Any significant discrepancy could be due to a blockage and so the system may send a control signal to the tap located at that location to command it to cease operation as well as optionally send an error alert to the operator.

Figure 5:
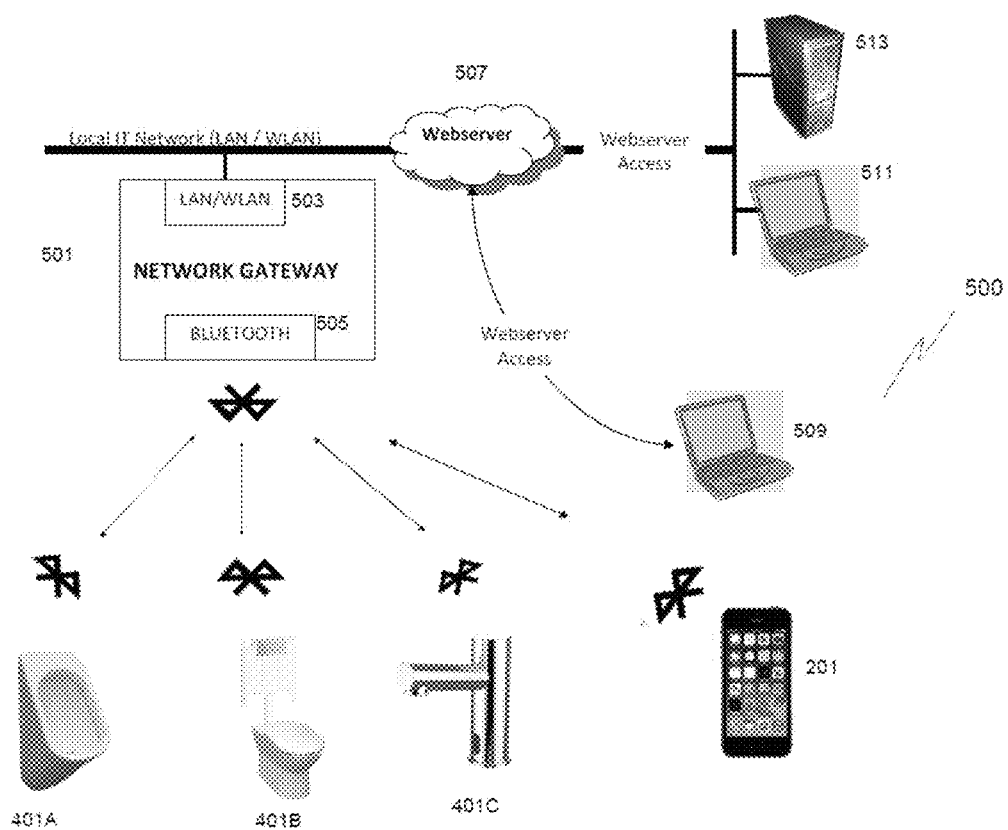
FIG. 5 shows a further water management system according to the herein disclosure.

FIG. 5 shows a further example of a water management system. This water management system 500 includes the same water control devices and electronic controllers as described above (401A, 401B, 401C). It also includes a mobile telephone 201 as described above. According to this example, a central gateway device 501 is also provided which communicates via Bluetooth to the various electronic controllers of the water control devices as well as to the mobile telephone 201. That is, the central gateway device 501 includes a wireless communication device 505, which in this example is a Bluetooth device. It will be understood that other wireless data formats, transmission methods or standards may be used besides Bluetooth™. Further, the central gateway device 501 includes a network connection module 503 to enable it to connect to a local network such as a LAN or WLAN. This enables the central gateway device to connect to a webserver 507 via the network. The webserver 507 may, for example, be a computing device as described above with reference to FIGS. 1A and 1B. Further computing devices 509, 511 and 513 may access the webserver via the suitable network connection such as an Internet connection.

It will be understood that, as an alternative, the webserver may not necessarily be an additional computer, but may operate using webserver software that has been loaded on to the central gateway device. That is, the central gateway device may incorporate a webserver therein and operate as a computing device with webserver functionality. This therefore simplifies access to the central gateway device and to the water control devices from arbitrary computers or mobile devices without the need for specialized software. Access to the central gateway device may be utilized through a standard web browser such as Microsoft Internet Explorer, Firefox, Safari, Google Chrome or the like. This enables the central gateway device to operate in a similar manner to standard WLAN routers, etc. Therefore, the central gateway device may function inside a local area network (LAN or WLAN) and enable other devices within that network to connect to it directly, rather than via a server located in the Internet as described above with reference to FIG. 5.

Therefore, according to these particular examples, the electronic controller of the water control devices may send operational data associated with operational parameters of the water control device to the central gateway device. The central gateway device may transmit this operational data to the mobile telephone 201 to enable it to operate as described above with reference to FIG. 4. In this way, the mobile telephone may communicate in a one-to-many configuration where the gateway device transfers the control data from the mobile telephone to the appropriate water control device. For example, the software operating on the mobile telephone may allocate unique IDs to each water control device so that the control data may be associated with those unique IDs. The central gateway device may then read the unique ID associated with the control data and transfer the data to the correct water control device.

The mobile telephone may therefore control one or more operational parameters of the water control devices either individually or as a group. For example, the mobile telephone may control one or more water control devices at the same time, or one at a time.

According to one example, not only may the mobile telephone acting as a computing device retrieve operational data from the central gateway device, the operational data may also be sent via the network to the webserver and stored at the webserver. This therefore enables other computing devices to retrieve the operational data from the webserver. For example, the mobile telephone 201 may access the operational data either via the central gateway device 501, via webserver software within the central gateway device or via a connection to a webserver through the internet. In this way, the mobile telephone may be used as a service tool for engineers to monitor and control operational parameters of the water control devices while in the local vicinity of the bathroom facility in which the water control devices are installed.

As a further example, an administration tool 509 in the form of a computing device as described above with reference to FIGS. 1A and 1B may access the webserver 507 in order to retrieve the operational data from the webserver. This administration tool 509 may then develop control data based on the retrieved operational data and send that control data back to the electronic controller via the webserver and the central gateway device. The control data may be developed in the same way as described above with reference to FIG. 4. Further, the electronic controller of the water control device is able to receive the control data and control the operational parameters of the water control device based on that received control data. The administration tool 509 enables the management of one or more water control devices in a single bathroom facility.

As a further example, a management tool 511 in the form of a computing device as described above with reference to FIGS. 1A and 1B may also access the webserver to retrieve the operational data from the webserver and develop control data based on the retrieved operational data. Again, the control data may be developed in the same way as described above with reference to FIG. 4. In this example, the management tool 511 is a computing device that forms part of a building management system. This therefore enables the management tool to control one or more water control devices in one or more bathroom facilities in one or more buildings. In addition, it also enables the management tool to monitor water usage of any individual water control device located in any of the bathroom facilities within any of the buildings managed by that building management system.

Therefore, a number of different electronic controllers associated with different water control devices may be located in multiple bathroom facilities. Multiple central gateway devices may be arranged to receive the operational data from the electronic controllers in an associated bathroom facility. That is, a single central gateway device may be in communication with multiple water control devices in a single bathroom facility.

These various computing devices 509 and 511 (as well as 201) may also determine a mode of operation for the water control devices based on water supply as described above with reference to FIG. 4. That is, these computing devices may be arranged to determine the mode of operation and develop control data based on that determined mode of operation and operational parameters. The control data may then be developed to control a reduction in water use by the water control device in the various ways discussed above.

Further, the system as described herein may provide information & reporting functionalities. For example, the system may analyze the data received from the various water control devices and provide the user and/or facility manager with information on water usage associated with individual water control devices. The system may identify issues such as exceptional water usage (for example, caused by leakage) or high water usage rates, which may indicate more frequent maintenance is required.

The system may identify faulty water control devices and perform actions based on the identification of various issues. The system may shut the water control device down, for example, and inform the operator that action is required. For example, a notification system may issue a notification in the form of an audible, visual or electronic alert. The electronic alert may be, for example, an email, SMS or other suitable electronic message.

With regards to the adjustable mode of operation as described herein, the system may analyze the data received from one or more water control devices when operating in different modes and generate and provide reports to the user/facility manager, or even government authorities, to show compliance with water restriction requirements. Further, these reports may generate and provide information indicating the actual water savings achieved through the use of specific modes of operation.

Figure 6:
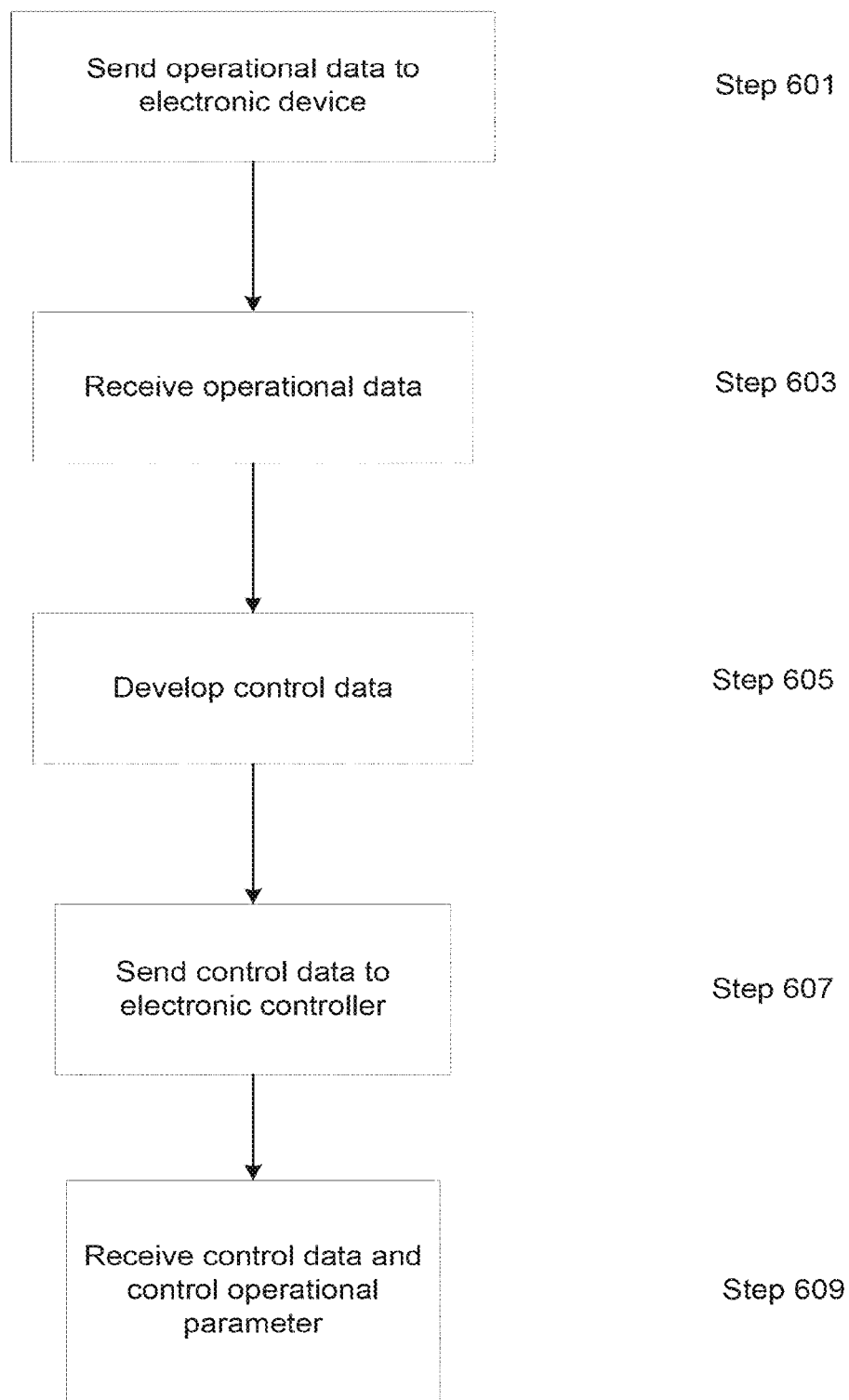
FIG. 6 shows a water management process according to the herein disclosure.

FIG. 6 shows a water management process according to a particular example. According to this process an electronic controller sends operational data associated with the operational parameter of the water control device to an embedded electronic device. Further, the embedded electronic device receives the operational data and develops control data based on the received operational data. Further, the embedded electronic device sends the control data to the electronic controller. The electronic controller receives the control data and controls the operational parameter of the water control device based on the received control data.

Figure 7:
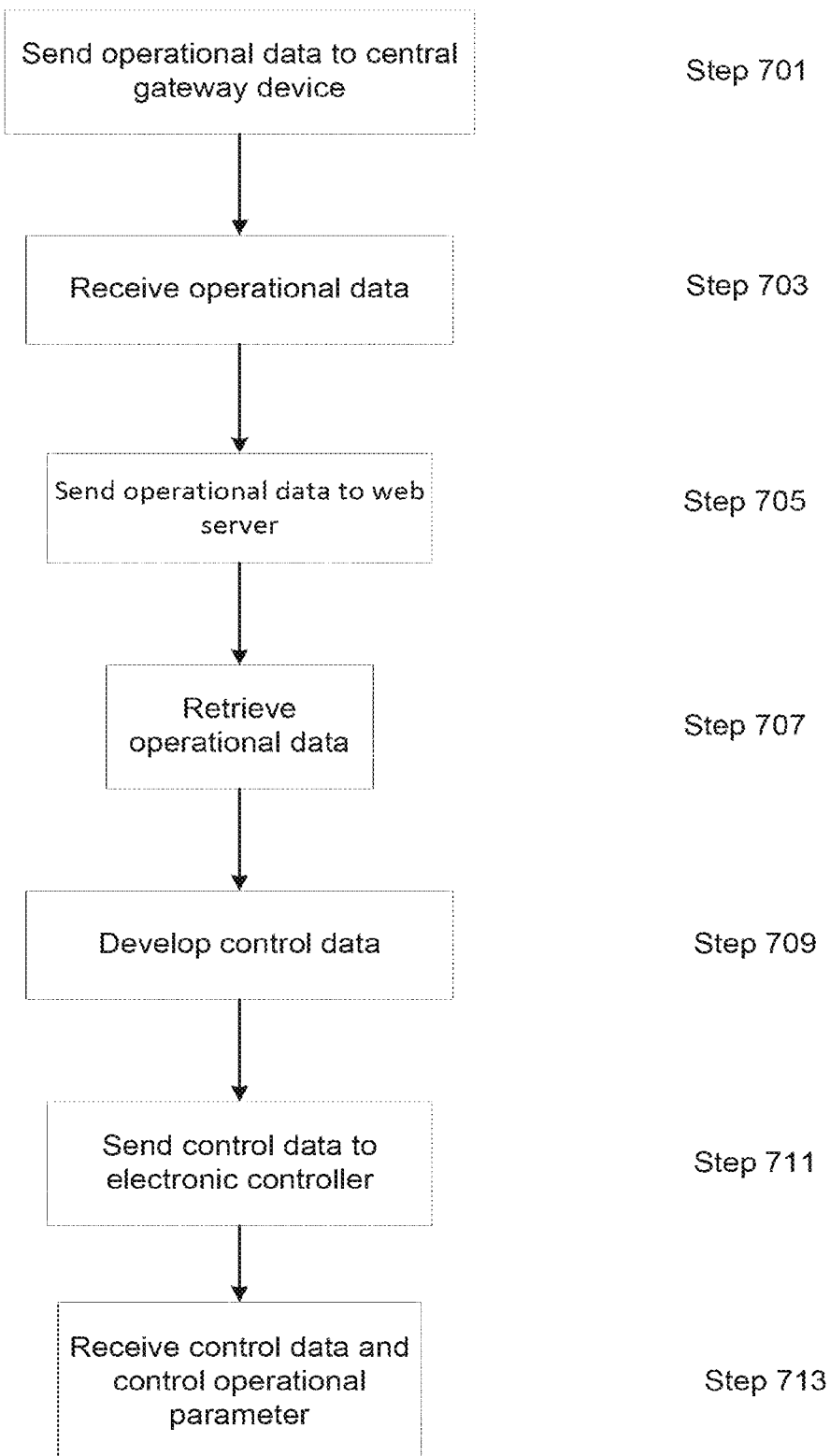
FIG. 7 shows a further water management process according to the herein disclosure.

FIG. 7 shows a further water management process wherein the electronic controller sends operational data associated with the operational parameter to at least one central gateway device. Further, the central gateway device receives the operational data and sends the operational data to a webserver. The operational data from the webserver is then retrieved using a computing device. The computing device develops the control data based on the retrieved operational data. The control data is then sent to the electronic controller via the webserver and the central gateway device. The electronic controller receives the control data and controls the operational parameter of the water control device based on the received control data.

Figure 8:
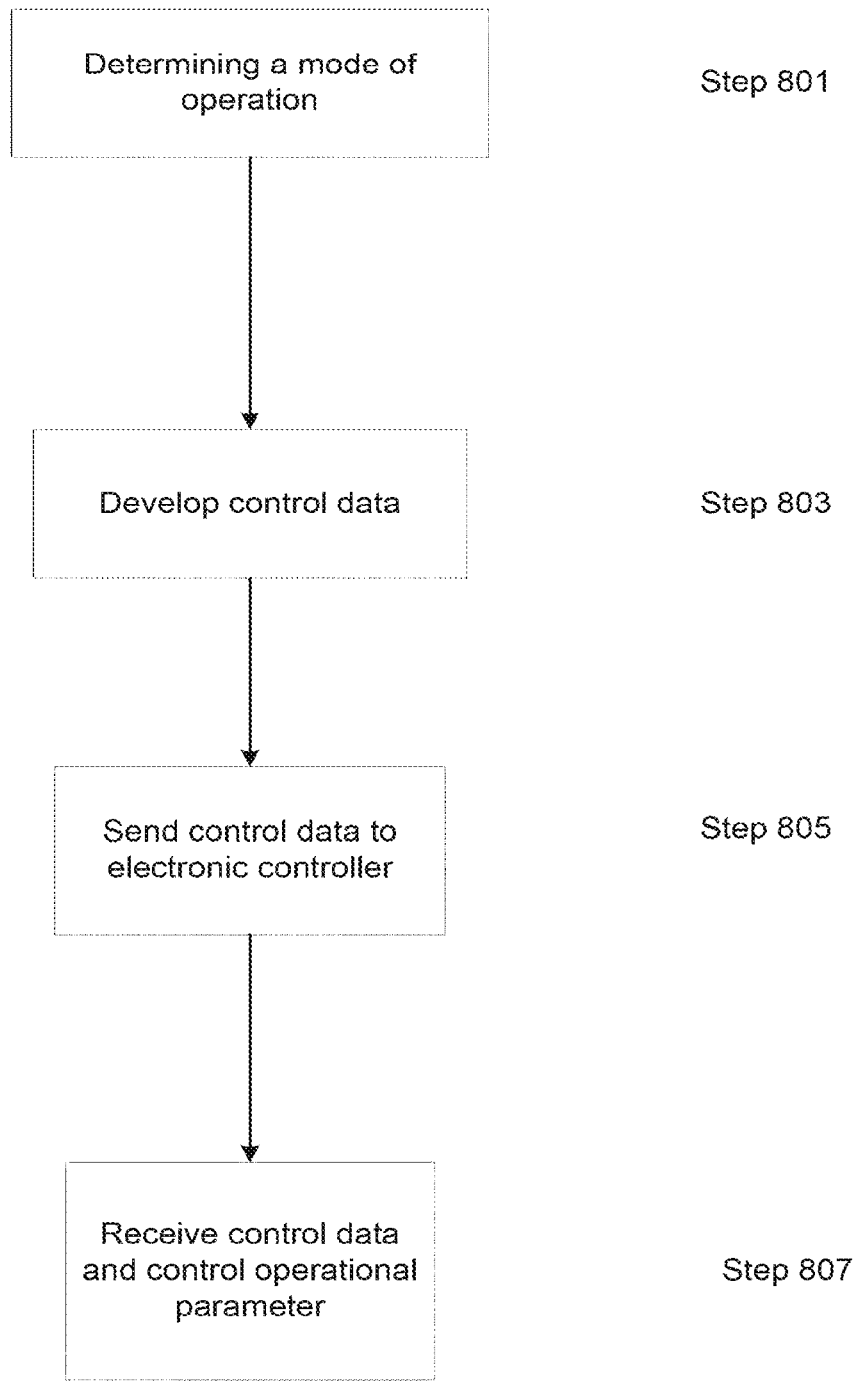
FIG. 8 shows a further water management process according to the herein disclosure.

FIG. 8 shows a further water management process wherein a computing device determines a mode of operation for the water control device based on water supply. The computing device develops control data based on the determined mode of operation and the operational parameter of the water control device. The computing device then sends the control data to the electronic controller of the water control device. The electronic controller receives the control data and controls the operation parameter based on received control data.

Figure 9:
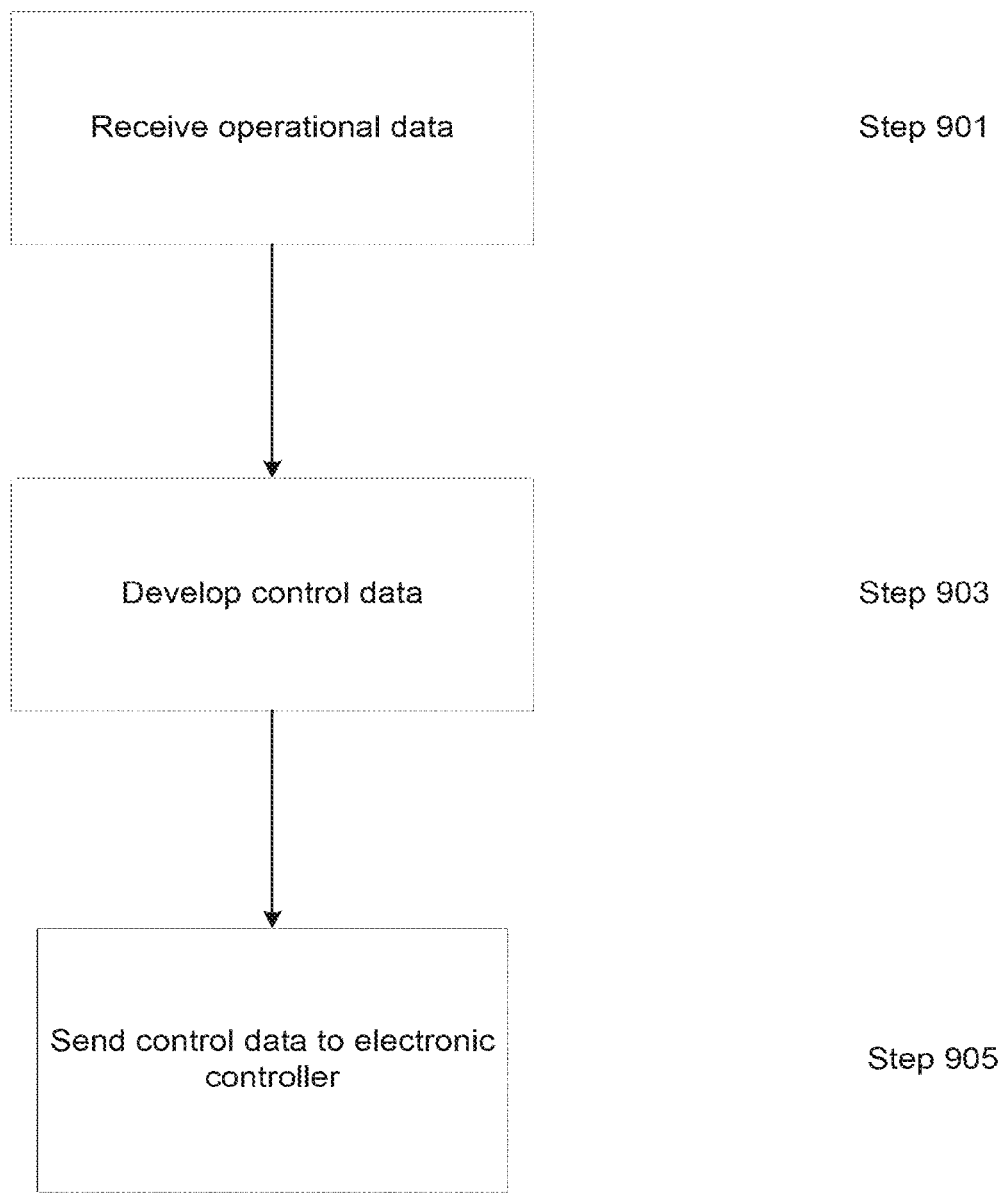
FIG. 9 shows a further water management process according to the herein disclosure.

FIG. 9 shows a further water management process wherein a computing device receives operational data associated with the operational parameter from the electronic controller of the water control device. The computing device develops control data based on the received operational data. The computer device then sends the control data to the electronic controller for controlling the operational parameter of the water control device based on the received control data.

According to this process, the computing device may receive the operational data from the electronic controller via a central gateway device and/or a webserver. Further, the computing device may send the operational data to the electronic controller via the central gateway device and/or the webserver. Also, the computing device may determine a mode of operation for the water control device based on water supply as described herein. The computing device may develop the control data based on the determined mode of operation and the operational parameters of the water control device. That is, the control data may be developed to control a reduction in water use by the water control device as described above.

INDUSTRIAL APPLICABILITY

The arrangements described are applicable to the computer and data processing industries and particularly for the water control device management and control industry.

The foregoing describes only some embodiments of the present disclosure, and modifications and/or changes can be made thereto without departing from the scope and spirit of the disclosure, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A bathroom facility water management method of controlling at least one operational parameter of at least one water control device in a bathroom facility water management system comprising an embedded electronic device or a computing device, wherein the operational parameter is associated with water used by the water control device, the method comprising the steps of:
   sending, from an electronic controller of the water control device, operational data associated with the operational parameter to the embedded electronic device or computing device when the embedded electronic device or the computing device is in communication with the electronic controller;
   receiving, at the embedded electronic device or the computing device, the operational data, and developing control data based on the received operational data and sending the control data to the electronic controller when the embedded electronic device or the computing device is in communication with the electronic controller;
   wherein the electronic controller is arranged to operate in a plurality of modes, wherein a first water usage mode of the plurality of modes is based on standard water usage and a second water usage mode of the plurality of modes is based on reduced water usage;
   wherein, in the second water usage mode, the control data is developed to enable the electronic controller to control the operational parameters to reduce the amount of water used by the water control device in a defined period of time either (a) by a percentage of water volume compared to a water volume used in a standard mode or (b) by a defined volumetric amount or (c) to reduce the time that water flow is activated or (d) to reduce the time that water flow is activated at a standard rate or an adjusted rate; and
   receiving, at the electronic controller, the control data and controlling the operational parameter of the water control device based on the received control data.

2. The method of claim 1, further comprising the step of allocating unique IDs to each water control device in the bathroom facility water management system, and associating the control data with the allocated unique IDs.

3. The method of claim 1, wherein the computing device is one of a computing system and a building management system.

4. The method of claim 1, wherein the water control device is at least one of a bathroom, restroom, toilet or kitchen product or plumbing fixture chosen from a group of bathroom, restroom, toilet or kitchen products or plumbing fixtures comprising a thermostatic mixing valve, a urinal, a toilet, a tap unit, a cistern, a shower, a basin, a water recirculation pump or a water storage unit.

5. The method of claim 1, wherein the bathroom facility water management system further comprises an administration level computing device and a management level computing device, wherein the method further comprises the steps of:
   controlling, at the administration level computing device, a plurality of the water control devices in a single bathroom facility via the embedded electronic device or the computing device based on the operational data; and
   controlling, at the management level computing device, a plurality of the water control devices in a plurality of bathroom facilities via the embedded electronic device or the computing device based on the operational data.

6. The method of claim 1, wherein the bathroom facility water management system further comprises at least one central gateway device and a management level computing device, wherein the method further comprises:
   sending, from the electronic controller, the operational data to the at least one central gateway device;
   controlling, at the management level computing device, a plurality of water control devices in a plurality of bathroom facilities via the at least one central gateway device based on the operational data; and
   controlling, at the management level computing device, a plurality of water control devices in a plurality of bathroom facilities via the at least one central gateway device based on the operational data.

7. The method of claim 6, further comprising the steps of:
   sending the operational data from the electronic controller to the at least one central gateway device; and
   sending the operational data from the at least one central gateway device to the embedded electronic device.

8. The method of claim 7, further comprising the steps of:
   sending the operational data from the at least one central gateway device to a web server; and
   accessing, by an administration level computing device or management level computing device, the operational data from the web server to control the water control devices.

9. The bathroom facility water management method of claim 1, wherein the second water usage mode is determined based on an assessment by the embedded electronic device or the computing device of at least one current environmental condition or current environmental situation.

10. The bathroom facility water management method of claim 9, wherein the assessment is based on data retrieved via an external, centralized environmental information database.

11. A water management system for controlling at least one operational parameter of at least one water control device, wherein the operational parameter is associated with water used by the water control device, the water management system comprising at least one water control device having an electronic controller, and an embedded electronic device or a computing device, wherein:
- the electronic controller is arranged to send operational data associated with the operational parameter to the embedded electronic device or computing device when the embedded electronic device or the computing device is in communication with the electronic controller;
- the embedded electronic device or computing device is arranged to receive the operational data, develop control data based on the received operational data and send the control data to the electronic controller when the embedded electronic device or the computing device is in communication with the electronic controller;
- wherein the electronic controller is arranged to operate in a plurality of modes, wherein a first water usage mode of the plurality of modes is based on standard water usage and a second water usage mode of the plurality of modes is based on reduced water usage;
- wherein, in the second water usage mode, the control data is developed to enable the electronic controller to control the operational parameters to reduce the amount of water used by the water control device in a defined period of time either (a) by a percentage of water volume compared to a water volume used in a standard mode or (b) by a defined volumetric amount or (c) to reduce the time that water flow is activated or (d) to reduce the time that water flow is activated at a standard rate or an adjusted rate; and
- the electronic controller is further arranged to receive the control data and control the operational parameter of the water control device based on the received control data.

12. The water management system of claim 11, wherein the embedded electronic device or computing device allocate unique IDs to each water control device in the water management system, and associate the control data with the allocated unique IDs.

13. The water management system of claim 11, wherein the computing device is one of a computing system and a building management system.

14. The water management system of claim 11, wherein the water control device is at least one of a bathroom, restroom, toilet or kitchen product or plumbing fixture chosen from a group of bathroom, restroom, toilet or kitchen products or plumbing fixtures comprising a thermostatic mixing valve, a urinal, a toilet, a tap unit, a cistern, a shower, a basin, a water recirculation pump or a water storage unit.

15. The water management system of claim 11, wherein the water management system further comprises an administration level computing device and a management level computing device,
- wherein the administration level computing device is arranged to control a plurality of the water control devices in a single bathroom facility via the embedded electronic device or the computing device based on the operational data, and
- the management level computing device is arranged to control a plurality of the water control devices in a plurality of bathroom facilities via the embedded electronic device or the computing device based on the operational data.

16. The water management system of claim 11,
- wherein the bathroom facility water management system further comprises at least one central gateway device and a management level computing device,
- wherein the electronic controller is arranged to send the operational data to the at least one central gateway device, and
- wherein the management level computing device is arranged to control a plurality of water control devices in a plurality of bathroom facilities via the at least one central gateway device based on the operational data.

17. The water management system of claim 16, wherein the electronic controller is arranged to send the operational data to the at least one central gateway device, and
the at least one central gateway device is arranged to send the operational data to the embedded electronic device.

18. The water management system of claim 17 further comprising a web server and an administration level computing device, wherein
- the at least one central gateway device is arranged to send the operational data to the web server, and
- the administration level computing device or the management level computing device is arranged to access the operational data from the web server to control the water control devices.

19. The water management system of claim 11, wherein the second water usage mode is determined based on an assessment by the embedded electronic device or the computing device of at least one current environmental condition or current environmental situation.

20. The water management system of claim 19, wherein the assessment is based on data retrieved via an external, centralized environmental information database.

* * * * *